(12) United States Patent
Sheiretov et al.

(10) Patent No.: US 12,234,700 B2
(45) Date of Patent: Feb. 25, 2025

(54) METHOD AND SYSTEM FOR SIMULTANEOUS WIRELINE MILLING AND DEBRIS COLLECTION

(71) Applicant: Schlumberger Technology Corporation, Sugar Land, TX (US)

(72) Inventors: Todor Sheiretov, Houston, TX (US); Robert Kyle Wiesenborn, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/724,304

(22) PCT Filed: Mar. 24, 2023

(86) PCT No.: PCT/US2023/016239
§ 371 (c)(1),
(2) Date: Jun. 26, 2024

(87) PCT Pub. No.: WO2023/183577
PCT Pub. Date: Sep. 28, 2023

(65) Prior Publication Data
US 2024/0418050 A1    Dec. 19, 2024

Related U.S. Application Data

(60) Provisional application No. 63/269,929, filed on Mar. 25, 2022.

(51) Int. Cl.
*E21B 27/00*    (2006.01)
*E21B 29/00*    (2006.01)
(Continued)

(52) U.S. Cl.
CPC .............. *E21B 29/00* (2013.01); *E21B 31/08* (2020.05); *E21B 37/00* (2013.01); *F16H 1/46* (2013.01); *E21B 27/00* (2013.01)

(58) Field of Classification Search
CPC .......... E21B 29/00; E21B 31/08; E21B 37/00; E21B 27/00; F16H 1/46
See application file for complete search history.

(56) References Cited

U.S. PATENT DOCUMENTS 5,176,208 A    1/1993  Lalande
6,158,512 A   12/2000  Unsgaard
(Continued)

FOREIGN PATENT DOCUMENTS

WO    2005033471 A1    4/2005
WO    2007144157 A1   12/2007

OTHER PUBLICATIONS

Search Report and Written Opinion of International Patent Application No. PCT/US2023/016239 dated Jul. 14, 2023, 7 pages.

*Primary Examiner* — Steven A MacDonald
(74) *Attorney, Agent, or Firm* — Jeffrey D. Frantz

(57) ABSTRACT

A system for performing a mechanical operation on a wireline is described including: a motor; a gear train coupled to the motor, the gear train including a first and a second rotational output, the first and second rotational outputs having different rotational speeds relative to each other; a fluid pump coupled to both the first and second rotational outputs, the fluid pump including: a pump housing coupled to the first rotational output, and a pump input coupled to the second rotational output; and a milling bailer coupled to the housing of the fluid pump and configured to rotate with the fluid pump housing, the milling bailer including: a bailer portion shaped to intake fluid and allow the fluid to flow through a filter and the fluid pump; and a milling face (Continued)

including a bit and configured to perform a milling operation while fluid is flowing through the bailer portion.

20 Claims, 6 Drawing Sheets

(51) Int. Cl.
*E21B 31/08* (2006.01)
*E21B 37/00* (2006.01)
*F16H 1/46* (2006.01)

(56) References Cited

U.S. PATENT DOCUMENTS

| | | | |
|---|---|---|---|
| 11,125,033 B2 * | 9/2021 | Edvardsen | E21B 27/00 |
| 2010/0018775 A1 | 1/2010 | Hallundbaek | |
| 2012/0211229 A1 * | 8/2012 | Fielder | E21B 37/00 |
| | | | 166/170 |
| 2014/0326510 A1 * | 11/2014 | Wessel | E21B 27/04 |
| | | | 175/57 |
| 2018/0058146 A1 * | 3/2018 | Gråbæk | E21B 4/04 |
| 2019/0257165 A1 * | 8/2019 | Toge | E21B 27/005 |
| 2020/0300049 A1 * | 9/2020 | Edvardsen | E21B 27/04 |

* cited by examiner

LEGEND

STATIONARY BODY 102
 ROTARY SEAL 104
 ROTARY BEARING 106
 FIXED JOINT 108

GEAR MESH 110
 FLUID FLOW 112
 BIT FACE 114
 DIRECTION OF ROTATION 116

METHOD AND SYSTEM FOR SIMULTANEOUS WIRELINE MILLING AND DEBRIS COLLECTION

CROSS REFERENCE TO RELATED APPLICATIONS

This application is a National Stage Entry of International Application No. PCT/US2023/016239, filed on Mar. 24, 2023, which claims the benefit of U.S. Provisional Patent Application No. 63/269,929, filed on Mar. 25, 2022, which is hereby incorporated by reference in its entirety.

BACKGROUND

The present disclosure is related in general to wellbore equipment such as oilfield equipment, downhole assemblies, and the like.

In some oilfield and hydrocarbon related operations, a milling tool can be advanced into a wellbore on a wireline to perform milling operations, which can involve the removal of material within a borehole. For example, milling can be used to remove obstructions from the borehole, remove scale from the borehole wall, enlarge the borehole, and mill through valves and plugs that need to be removed. This milling process typically requires a low-revolution-per-minute ("RPM") and high-torque output at the milling bit, which is the portion of a milling tool that contacts the material to be removed.

The removal of material within a borehole produces debris that must be removed for proper operation of the wellbore. Typically, debris removal is a separate mechanical service run on a wireline. A typical debris collection device has a powerful pump that circulates well fluids through collection bailers that separate any solids from the fluids. The solids are deposited inside the bailers, which are brought to surface to be emptied. The pump of the debris collection device is typically driven by a torque output lower than that required for milling operations.

When run on their own, milling and debris-collection devices each have their own respective limitations. For example, performing a milling operation without fluid circulation can cause the milling tool to become stuck due to milling debris settling in and around the milling tool. The milling process may also be slowed if debris are not removed from the cutting interface. Due to these limitations, independent milling operations are typically only performed on flowing wells where the existing flow of fluids in the well carries the cuttings away from the milling tool.

Similarly, debris collection has limitations when performed on its own, such as to collect debris from a previous milling operation. For example, after a milling operation, debris can settle and consolidate within the borehole. The consolidated debris is difficult to pick up by a debris collector. As a result, a debris collection tool must somehow brake up, stir, and fluidize the debris before pumping the surrounding fluid through bailers to capture the debris.

Combining milling and debris-collection devices can bring various benefits. For example, the combination can improve the milling process as a result of adding forced circulation and debris removal. It can also improve the debris collection process as the debris are continuously stirred and reduced in size by the milling bit.

However, combining these tools has proven to be challenging, and combination tools to date have had various downsides. For example, simply combining the two individual tools leads to excessively long and heavy tools, which may be impossible to deploy on a wireline due to their mass. Integrated combination tools produced to date have been overly complex, requiring specialized bailers with additional moving parts or distinct geartrains that introduce additional cost and complexity.

As a result, a need exists for a combination milling and debris collection tool that can utilize standard bailers and that uses a single geartrain.

It is against this backdrop that the disclosed embodiments are described herein.

SUMMARY

In various embodiments, a device is provided for performing a mechanical operation on a wireline. The device can include: a motor; a gear train coupled to the motor, the gear train including a first rotational output and a second rotational output, the first and second rotational outputs having different rotational speeds relative to each other; a fluid pump coupled to both the first and second rotational outputs of the gear train, the fluid pump including: a pump housing coupled to the first rotational output of the gear train, and a pump input coupled to the second rotational output of the gear train; and a milling bailer coupled to the housing of the fluid pump and configured to rotate with the fluid pump housing, the milling bailer including: a bailer portion shaped to intake fluid proximate a distal end of the bailer portion and allow the fluid to flow through a filter and through the fluid pump; and a milling face proximate the distal end of the bailer portion, the milling face including at least one bit for milling and configured to perform a milling operation while fluid can be flowing through the bailer portion.

In some embodiments, the gear train includes a three-stage planetary gear box including a sun gear, at least one planet gear coupled to the sun gear, and a planetary carrier gear coupled to the at least one planet gear. In other embodiments, the first rotational output of the gear train can be coupled to the sun gear of the gear box and wherein the second rotational output of the gear train can be coupled to the planetary carrier gear of the gear train. In some embodiments, the sun gear and planetary carrier gear rotate in a same direction. In other embodiments, the sun gear and the planetary carrier gear rotate in opposite directions. In some embodiments, the gear train can be driven by a single input from the motor. In various embodiments, the fluid pump can be driven based on the rotational difference between the first and second rotational outputs. In some embodiments, the distal end of the bailer portion includes an aperture in the milling face that allows the fluid to enter an interior portion of the bailer portion. In other embodiments, device further includes a wireline cable head that receives the wireline and securely couples the device to the wireline.

In various embodiments, a method of simultaneous milling and debris collection can be described. The method can include: providing a tool, the tool including: a motor; a gear train coupled to the motor, the gear train including a first rotational output and a second rotational output, the first and second rotational outputs having different rotational speeds relative to each other; a fluid pump coupled to both the first and second rotational outputs of the gear train, the fluid pump including: a pump housing coupled to the first rotational output of the gear train, and a pump input coupled to the second rotational output of the gear train; and a milling bailer coupled to the housing of the fluid pump and configured to rotate with the fluid pump housing, the milling bailer including: a bailer portion shaped to intake fluid proximate a distal end of the bailer portion and allow the fluid to flow through a filter and through the fluid pump; and a milling face proximate the distal end of the bailer portion, the milling face including at least one bit for milling and configured to perform a milling operation while fluid can be flowing through the bailer portion; lowering the tool down a well using the wireline; positioning the tool such that the milling face can be in contact with a surface to be milled; and operating the motor such that the milling bailer rotates, causing the milling face to mill the surface while fluid flows through the bailer portion to the fluid pump.

In some embodiments, the gear train includes a three-stage planetary gear box including a sun gear, at least one planet gear coupled to the sun gear, and a planetary carrier gear coupled to the at least one planet gear. In various embodiments, the first rotational output of the gear train can be coupled to the sun gear of the gear box and wherein the second rotational output of the gear train can be coupled to the planetary carrier gear of the gear train. In some embodiments, the sun gear and planetary carrier gear rotate in a same direction. In other embodiments, the sun gear and the planetary carrier gear rotate in opposite directions. In some embodiments, the gear train can be driven by a single input from the motor. In various embodiments, the fluid pump can be driven based on the rotational difference between the first and second rotational outputs. In some embodiments, the distal end of the bailer portion includes an aperture in the milling face that allows the fluid to enter an interior portion of the bailer portion. In other embodiments, the device further includes a wireline cable head that receives the wireline and securely couples the device to the wireline.

The disclosed systems can have some advantages including, but not limited to the following. The disclosed systems can feature milling and debris collection functionality integrated in a way to prevent excessively long and heavy tool strings, which may be difficult to deploy on wireline, such as in oil-producing wells. That is, the disclosed systems can combine the milling and debris collection functions in a single device. Further, the disclosed systems may not require specialized bailers (e.g., bailer having complex designs including moving parts), which may be relatively complex and may be unreliable in certain field environments and/or conditions as compared with the disclosed systems.

This summary section is not intended to give a full description of the disclosed systems and methods. A detailed description with example implementations follows.

BRIEF DESCRIPTION OF THE DRAWINGS

The embodiments of the present invention are illustrated by way of example, and not by way of limitation, in the figures of the accompanying drawings and in which like reference numerals refer to similar elements. The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
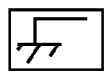
FIG. 1 shows a legend for the symbols used in various diagrams of the remaining figures, and an example gearbox using some of those symbols, in accordance with embodiments of the disclosure.
Figure 1:
Figure 1:
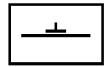
Figure 1:
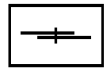
Figure 1:
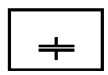
Figure 1:
Figure 1:
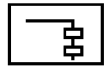
Figure 1:
Figure 1:
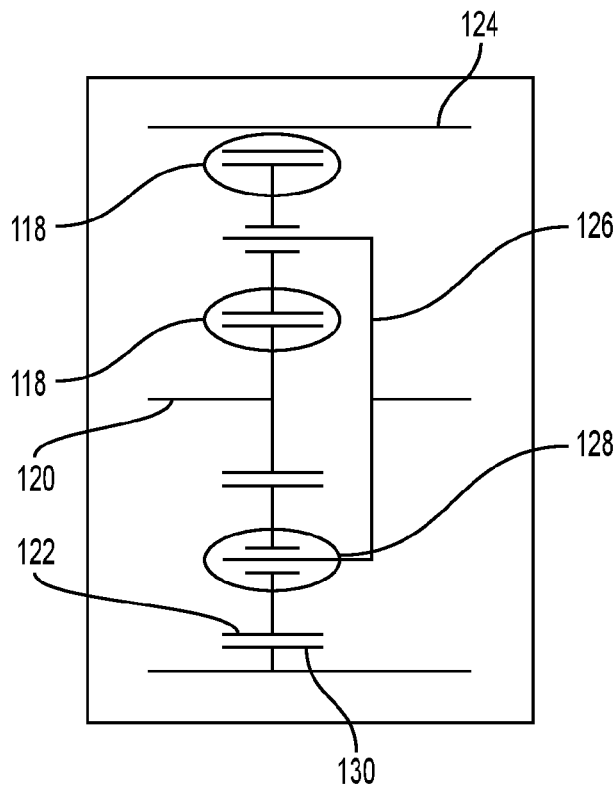

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

Aspects of the invention relate to systems and methods for simultaneous milling and debris collection which may be utilized for example in various types of field tools and the like. For purposes of clarity and brevity, aspects of the invention are described generally with reference to well-based operations. How to utilize aspects of the invention in devices (e.g., intakes, pumps, motors, etc.) other than those exact devices will be understood by those skilled in the art in view of this disclosure.

As used herein, the terms "up" and "down"; "upper" and "lower"; "top" and "bottom"; and other like terms indicating relative positions to a given point or element are utilized to more clearly describe some elements. Commonly, these terms relate to a reference point as the surface from which drilling operations are initiated as being the top point and the total depth of the well being the lowest point, wherein the well (e.g., wellbore, borehole) is vertical, horizontal or slanted relative to the surface.

In various aspects, the disclosed systems can include a device that can perform mechanical operations for simultaneously milling and debris removal on a wireline. The device can include a motor and can, in some aspects, advantageously be configured to operate with a single motor, which can be electric, fuel-based, or hybrid. The device can further include a gear train coupled to the motor and configured to operate based on the operation of the motor. In particular, the gear train can include at least two rotational outputs having different rotational speeds relative to each other. Moreover, the device can include a fluid pump connected to the rotational outputs of the gear train, the fluid pump serving to aid in the flow of fluids (e.g., water, gas, oil, etc.) to aid in the drilling and debris removal process of the wireline device. The fluid pump can feature a pump housing and a pump input. Further, the pump housing can be coupled to one of the rotational outputs of the gear train and the pump input can be coupled to another rotational output of the gear train.

Additionally, the device can include a milling bailer that can serve to remove fluids during the operation of the device while performing a milling operation. The milling bailer can be coupled to the housing of the fluid pump and can be configured to rotate with the fluid pump housing. The milling bailer can further include a bailer portion shaped to intake fluid proximate a distal end of the bailer portion and allow the fluid to flow through a filter and through the fluid pump. Moreover, the milling bailer can include a milling face proximate the distal end of the bailer portion. This milling face can include at least one bit for milling for performing a milling operation while fluid is flowing through the bailer portion.

In some embodiments, a device that performs both milling and debris collection at the same time as described herein has several advantages as it improves the milling process by adding forced circulation and efficient debris removal. Further, debris collection may also be more effective as the debris may be continuously stirred and reduced in size by the device's milling bit.

FIG. 1 shows a legend for the symbols used in various diagrams of the remaining figures, in accordance with embodiments of the disclosure. In particular, diagram 101 shows a schematic symbol for a stationary body indicator 102, a rotary seal indicator 104, a rotary bearing indicator 106, a fixed joint indicator 108, a gear mesh indicator 110, a fluid flow direction indicator 112, a bit face indicator 114, and a direction of rotation indicator 116. In some aspects, the stationary body indicator 102 can indicate any object or surface that has a fixed position and does not move relative to the tool. For example, the stationary body indicator 102 can be used to indicate a connection between a wireline and an anchor. In that example, the anchor can be any object holding the wireline above the wellbore surface, such as a winch. In another aspect, the rotary seal indicator 104 can indicate a seal for a rotating body, such as a shaft. The rotary seal can provide sealing and wiping functionality, such that fluid on one side of the seal is not allowed to travel to the opposing side of the seal. In some aspects, the rotary bearing indicator 106 can indicate can be used to indicate a rotary bearing, which carries a load by placing rolling elements between two bearing rings. The relative motion of the two bearing rings can enable the rolling elements to roll with little rolling resistance and with little sliding.

The fixed joint indicator 108 can indicate a fixed connection point between two objects, such as by welding, fastening, or any other technique for coupling. The gear mesh indicator 110 can indicate a connection point between two gears where the gears mesh such that the gears can transmit power to one another. For example, the gears can have individual teeth that engage a pair of teeth from another gear. The gear teeth can be straight teeth as in spur gears, or can be helical, double helical, bevel, worm, or hypoid in nature. In addition, the gears can be formed conventionally with teeth on the other edges of the gear, or they can take the form of a gear ring with teeth along the inside surface, such as a planetary ring gear.

The fluid flow indicator 112 can indicate a direction of fluid flow relative to a tool or part of a tool. The bit face indicator 114 can indicate the presence of one or more milling bits used by a tool to perform a milling operation.

The direction of rotation indicator 116 can indicate a direction of rotation of a tool or a portion of a tool, typically with respect to a central axis.

Further, diagram 103 shows an example schematic cross-sectional diagram of a planetary gear train having one input and one output, provided to illustrate an example using the schematics from diagram 101. The input of this example gear train can be a shaft coupled to a sun gear 120. The sun gear 120 can be central gear that is fixed to the input shaft such that it rotates at the same speed as the shaft. The sun gear 120, in turn, is coupled to at least two planet gears 122 (also referred to as "planetary gears") on opposing sides of the sun gear. Although only two planet gears 122 are shown, the assembly can include more than two planet gears 122. As shown in the diagram 103, each of the planet gears 112 meshes with the sun gear 120 at an interior mesh point 118 and meshes with a ring gear 130 at an exterior mesh point 118. The housing can be a planetary ring gear 130 that is mounted to a housing 124, as shown.

Figure 2:
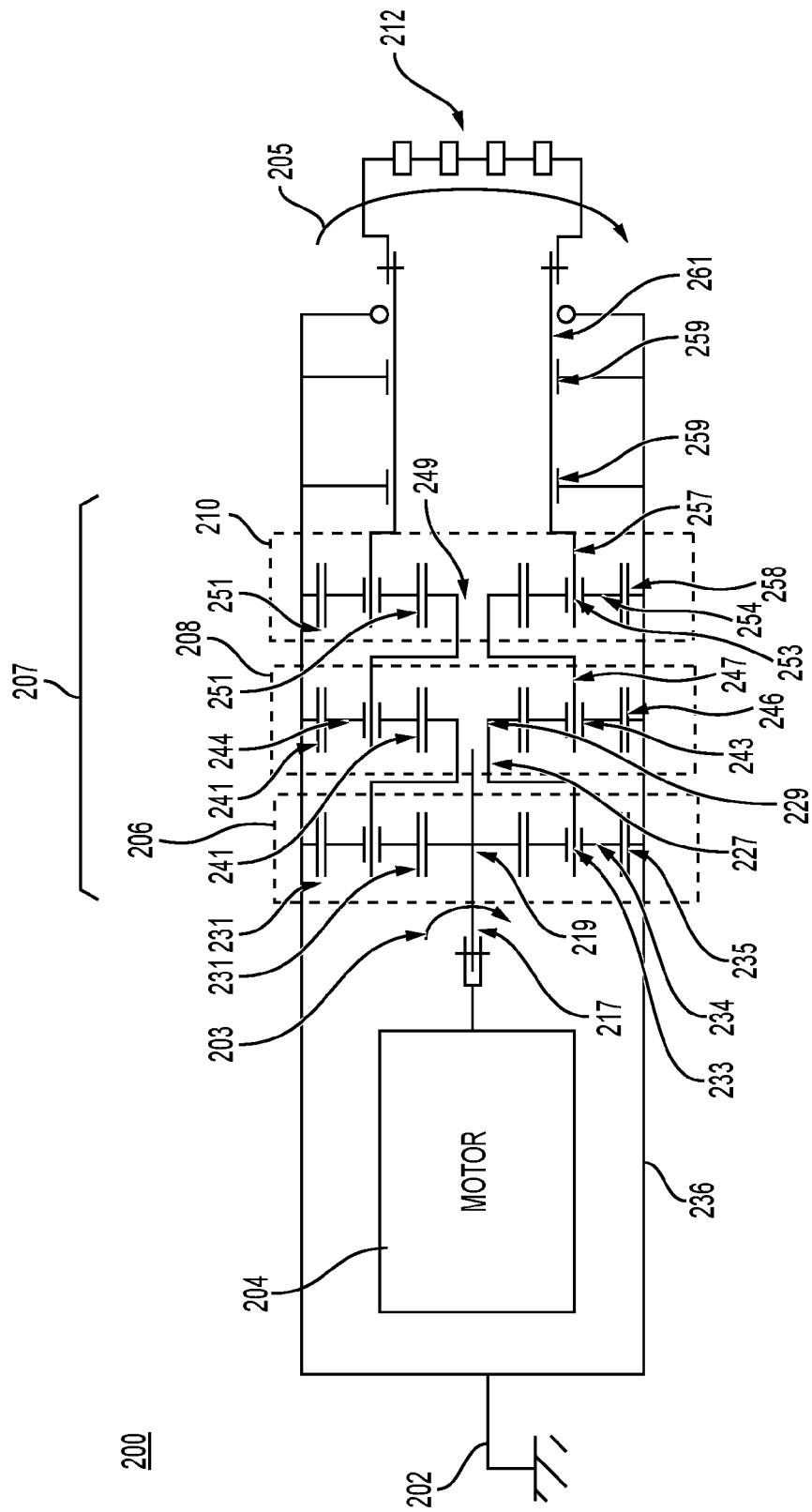
FIG. 2 shows an example schematic illustration of a stand-alone milling device, in accordance with embodiments of the disclosure.
Figure 3:
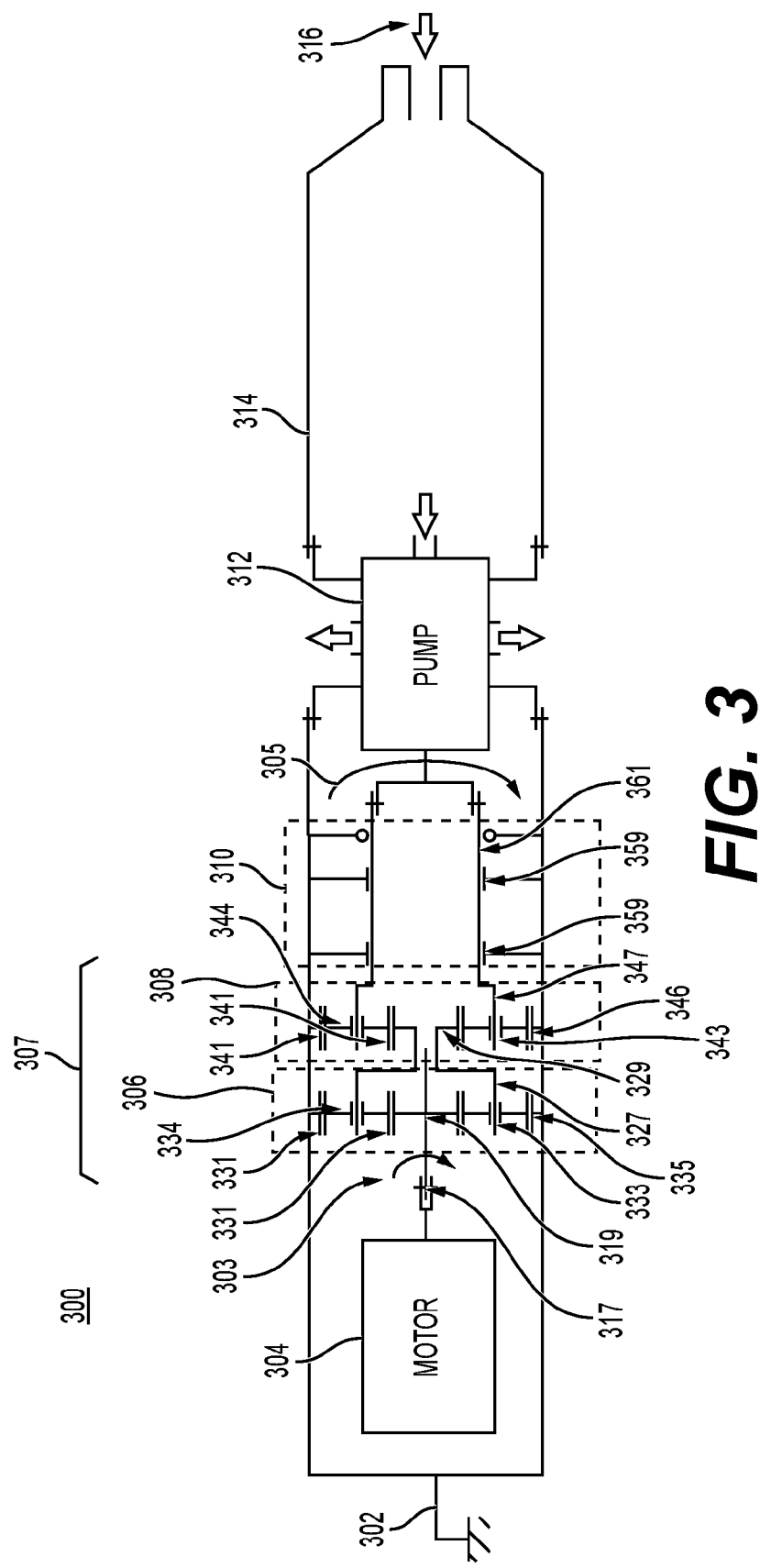
FIG. 3 shows an example schematic illustration of a stand-alone debris collection device, in accordance with embodiments of the disclosure.

As stated previously, the symbols described above are used across various diagrams in the Figures to represent corresponding components. For example, elements 231, 241, and 251 of FIG. 2 are mesh points illustrated using the gear mesh indicator 110. Similarly, elements 359 of FIG. 3 are rotary bearings illustrated using the rotary bearing indicator 106.

The diagram 103 also includes a planetary carrier 126 upon which the planet gears 122 are mounted. In this example, the planet gears 122 are mounted using a rotary bearing 128 that allows the planet gears 122 to rotate freely with respect to the planetary carrier 126. The movement of the planet gears 122 about the sun gear 120 thereby causes the planetary carrier 126 to rotate. As shown in the diagram 103, the planetary carrier 126 includes an output, such as a shaft mounted to the planetary carrier 126. The rotational movement of the planetary carrier is thereby converted to rotation of the output shaft.

FIG. 2 shows an example schematic of a stand-alone milling device, in accordance with embodiments of the disclosure. Such a device can be described by the schematic shown in cross-sectional diagram 200 and can mill metal or scale via a mechanical operation that can be run on wireline in order to remove an obstruction, remove scale from the borehole wall, enlarge the borehole, mill through valves and plugs, combinations thereof, and/or the like. In some aspects, the device can include a motor that drives the milling bit through a multi-stage gear train. The gear train can serve to convert high revolution per minute (RPM), low-torque motor output to a low-RPM, high-torque output at the bit, which can be used for milling.

In more detail, diagram 200 includes a schematic of an embodiment of a device that can be configured to perform milling operations and in which a motor 204 (e.g., an electric motor that is powered via an electrical connection 202) can drive a milling bit 212 through a gear train 207 (e.g., a three-stage planetary gear train, to be described below).

In some respects, the gear train 207 can include a first stage 206, a second stage 208, and a third stage 210. The gear train 207 can include a first rotational input 203 at the first stage 206. The remaining stages of the gear train 207 (e.g., the second stage 208 and the third stage 210) can be coupled to the first stage 206 and can be configured to modify the torque and/or power of the first stage 206 accordingly, and thereby transmit a predetermined amount of power to the milling bit 212 that performs a milling operation, as further described below.

In more detail, the first rotational input 203 at the first stage 206 can include a shaft 217 from motor 204 that can be coupled to a sun gear 219. The sun gear 219 can include a central gear that is fixed to the input shaft 217 such that it rotates at the same speed as the shaft 217. The sun gear 219, in turn, is coupled to at least two planet gears 234 on opposing sides of the sun gear 219. Although only two planet gears 234 are shown, the assembly can include more than two planet gears 234. Further, only one of the pair of planetary gears are labeled in the diagram 200 to reduce clutter in the diagram. As shown in the diagram 200, each of the planet gears 234 meshes with the sun gear 219 at an interior mesh point of the mesh points 231 and meshes with a ring gear 235 at an exterior mesh point of the mesh points 231. In this example the ring gear 235 is fixed relative to the milling tool. For example, the ring gear 235 can be mounted to a housing 236 of the milling tool, as shown.

The diagram 200 also includes a planetary carrier 227 spanning the first stage 206 and second stage 208 upon which the planet gears 234 are mounted. In this example, the planet gears 234 are mounted using a rotary bearing 233 that allows the planet gears 234 to rotate freely with respect to the planetary carrier 227. The movement of the planet gears 234 about the sun gear 219 thereby causes the planetary carrier 227 to rotate. The rotational movement of the planetary carrier 227 is thereby converted to second rotational input to the second stage 208.

In more detail, the second rotational input at the second stage 208 can be coupled to a sun gear 229 of the second stage 208. For example, rather than being coupled to a shaft 217 as explained with the sun gear 219 of the first stage 206, the sun gear 229 of the second stage 208 can be coupled to the planetary carrier 227 of the first stage 206. The sun gear 229 of the second stage 208, in turn, can mesh with at least two planet gears 244 on opposing sides of the second rotational input. Although only two planet gears are shown, the assembly can include more than two planet gears. As shown in the diagram 200, each of the planet gears 244 meshes with the sun gear 229 of the second stage 208 at an interior mesh point of the mesh points 241 and meshes with a ring gear 246 at an exterior mesh point of the mesh points 241. Again, the housing of the second stage 208 can be a planetary ring gear that is mounted to a housing 236, as shown, containing the planet gears 244 and providing an exterior mesh point 241 for the planet gears 244. The planet gears 244 can be mounted to a second planetary carrier 247 using rotary bearings 243, such that the planet gears 244 can rotate within the rotary bearings 243, but rotational movement of the center of the planet gears 244 around the sun gear 229 causes the second planetary carrier 247 to rotate.

The rotational movement of the second planetary carrier 247 provides a third rotational input to the third stage 210. The second planetary carrier 247 can span the second stage 208 and third stage 210, at which point the second planetary carrier 247 can be coupled to a sun gear 249 of the third stage 210 such that the rotational velocity of the second planetary carrier 247 matches that of the sun gear 249. The sun gear 249, in turn, can mesh with two or more planet gears 254. In this example, again, the planet gears 254 are mounted to a third planetary carrier 257 using a rotary bearing 253 that allows the planet gears to rotate freely with respect to the third planetary carrier 257. The movement of the planet gears 254 thereby causes the third planetary carrier 257 to rotate.

Although only two planet gears are shown, the assembly can include more than two planet gears. As shown in the diagram 200, each of the planet gears 254 meshes with the third sun gear 249 at an interior mesh point of the mesh points 251 and meshes with a ring gear 258 at an exterior mesh point of the mesh points 251. Again, the housing of the third stage 210 can include a planetary ring gear 258 that is mounted to a housing 236, as shown.

The planet gears 254 of the third stage 210 can be mounted to a third planetary carrier 257, as mentioned above, using rotary bearings 253 that allow the planet gears 254 to rotate freely within the third planetary carrier 257 while causing the third planetary carrier 257 to rotate.

In this example, the third planetary carrier 257 is coupled to a milling tool body 261 such that the two components rotate at the same speed. As shown, the milling tool body 261 can be supported on either side with one or more rotary bearings 259 that allow the milling tool body 261 to rotate within the housing 236 of the tool. The rotation of the milling tool body 261 in the rotation direction 205 causes the milling face 212 to rotate such that it can perform milling operations. For example, the bits of the milling face 212 can be brought into contact with material, such as a portion of a pipe or a valve, and the milling face 212 can remove material with a milling operation.

FIG. 3 shows an example schematic of a stand-alone debris collection device, in accordance with embodiments of the disclosure. In an example, a device depicted by diagram 300 can have a relatively powerful pump that circulates well fluids through a collection bailer (which can serve as separation and storage tank) that separate the fluids from any solids that these fluids may carry. In some respects, solids can be deposited inside the bailers, which can be brought to surface when full. The pump of the debris collection device can also be driven by an electric motor through a gear train. In some aspects, the gear train needed for debris collection may have fewer stages compared to a corresponding gear train needed for milling, at least because the fluid pump may not require as much torque as is needed for milling, as described below.

In particular, diagram 300 includes a schematic of an embodiment of a device that can be configured to perform debris collection operations in which a motor 304 (e.g., an electric motor that is powered via an electrical connection 302) can drive a fluid pump 312 through a gear train 307 (e.g., a two-stage gear train, to be described below). Further, the fluid pump 312 can circulate fluid through a milling bailer 314, which is shown as a tank.

In some respects, the gear train 307 can include a first stage 306 and a second stage 308. The gear train 307 can include a first rotational input 303 at the first stage 306. The second stage 308 can be coupled to the first stage 306 and can be configured to modify the torque and/or power of the first stage 306 accordingly, and thereby transmit a predetermined amount of power and energy to rotate and power the fluid pump 312 and the milling bailer 314 to perform a debris collection operation via fluid flow.

In more detail, the first rotational input 303 at the first stage 306 can be a shaft 317 coupled to a sun gear 319. The sun gear 319 can be central gear that is fixed to the input shaft 317 such that it rotates at the same speed as the shaft 317. The sun gear 319, in turn, is coupled to at least two planet gears 334 on opposing sides of the sun gear 319. Although only two planet gears are shown, the assembly can include more than two planet gears. Further, only one of the pair of planetary gears are labeled in the diagram 300 to reduce clutter in the diagram. As shown in the diagram 300, each of the planet gears 334 meshes with the sun gear 319 at an interior mesh point of the of the mesh points 331 and meshes with a ring gear 335 at an exterior mesh point of the mesh points 331. In this example the ring gear 335 is fixed relative to the debris collection tool. For example, the ring gear 335 can be mounted to a housing 336 of the debris collection tool, as shown.

The diagram 300 also includes a planetary carrier 327 spanning the first stage 306 and second stage 308 upon which the planet gears 334 are mounted. In this example, the planet gears 334 are mounted using a rotary bearing 333 that allows the planet gears 334 to rotate freely with respect to the planetary carrier 327. The movement of the planet gears 334 about the sun gear thereby causes the planetary carrier 327 to rotate. The rotational movement of the planetary carrier 327 is thereby converted to and serves as second rotational input to the second stage 308.

In more detail, the second rotational input (i.e., the rotational movement of the planetary carrier 327) at the second stage 308 can be coupled to a sun gear 329 of the second stage 308. For example, rather than being coupled to a shaft 317 as explained with the sun gear 319 of the first stage 306, the sun gear 329 of the second stage 308 can be coupled to the planetary carrier 327 of the first stage 306. The sun gear 329 of the second stage 308, in turn, can mesh with at least two planet gears 344 on opposing sides of the second rotational input. Although only two planet gears 344 are shown, the assembly can include more than two planet gears. As shown in the diagram 300, each of the planet gears meshes 344 with the sun gear 329 of the second stage 308 at an interior mesh point of the mesh points 341 and meshes with a ring gear 346 at an exterior mesh point of the mesh points 341. Again, the housing of the second stage 308 can be a planetary ring gear that is mounted to a housing 336, as shown, containing the planet gears 344 and providing an exterior mesh point 341 for the planet gears 344. The planet gears 344 can be mounted to a second planetary carrier 347 using rotary bearings 343, such that the planet gears 344 can rotate within the rotary bearings 343, but rotational movement of the center of the planet gears 344 around the sun gear 329 causes the second planetary carrier 347 to rotate.

The rotational movement of the second planetary carrier 347 provides a third rotational input to the third stage 310. The second planetary carrier 347 can span the second stage 308 and third stage 310, either directly or by being coupled to a rotational body 361 used as an input for the pump 312. The rotational body 361 can be positioned inside the housing 336 of the tool, supported on either side with one or more rotary bearings 359 that allow the rotational body 361 to rotate within the housing 336. The rotational movement of the rotational body 361 is coupled to the pump as an input, thereby converting the rotational movement to an input to the pump 312. In particular, the rotation of the second planetary carrier 347 can directly rotate and power the pump 312, for example, as shown via the direction of rotation indicator 305. As noted, the fourth rotational input can thereby transmit a predetermined amount of power and energy to rotate and power the fluid pump 312 and the milling bailer 314 to perform a debris collection operation via fluid flow at aperture 316. As shown, the fourth rotational input can turn the fluid pump 312 due to its connection at fixed joints. Further, the rotation of the fluid pump 312 can rotate the bailer 314.

Using the rotational input described above, the pump 312 can circulate fluid and filter out debris. For example, fluid can be ingested into a bailer 314 at an inlet 316 located at a distal end of the bailer 314. The fluid can then be pulled through the pump 312 and ejected outward from the tool, as shown by the solid arrows in diagram 300. One or more filters can be place inside the bailer 314, such that debris remains inside the bailer 314 while fluid flows through the bailer 314 and then through the pump 312. As shown in the diagram, in this example, neither the pump housing nor the bailer 314 rotates with respect to the tool housing 336.

Figure 4:
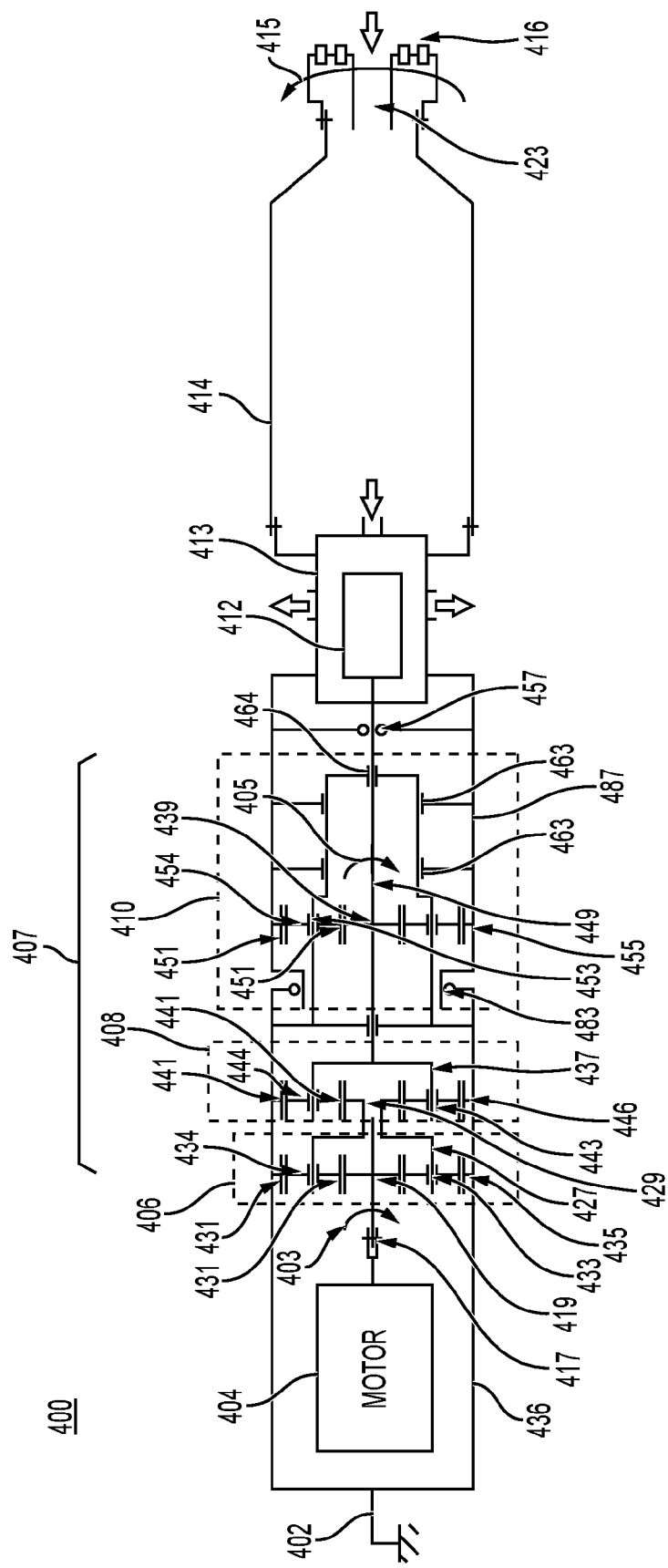
FIG. 4 shows an example schematic illustration of a first embodiment of a combined milling and debris collection device, in accordance with embodiments of the disclosure.
Figure 5:
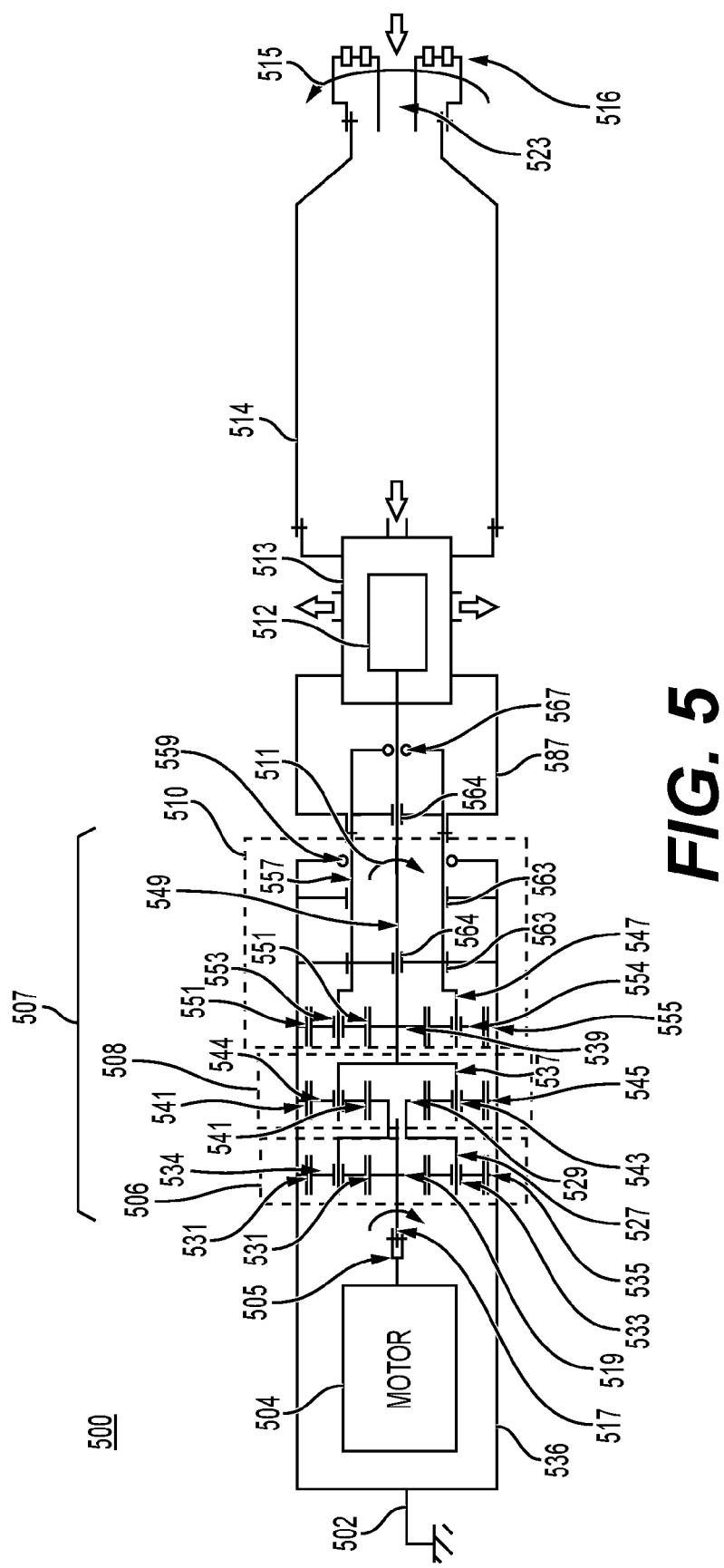
FIG. 5 shows another example schematic illustration of another embodiment of a combined milling and debris collection device, in accordance with embodiments of the disclosure.

FIGS. 4 and 5 shows related embodiments of a combined milling and debris collection device, and in which additional portions of the entire device, including the milling bailer (to be shown and described), rotates. Such embodiments allow for the use of relatively simple bailers to be used in connection with the device that can be substantially similar and/or identical to bailers used with a stand-alone debris removal device such as that shown and described in connection with FIG. 3, above. In addition, the disclosed embodiments can enable a stand-alone milling device such as that shown and described in connection with FIG. 2, above, to be converted to a combined milling and debris collection device by modifying a last stage of the stand-alone milling device's three-stage gear train (such as the third stage 210 of gear train 207 of FIG. 2), as further shown and described below. Such embodiments can enable the ease of adoption of milling and debris removal devices in the field. Further, the gear train can include a planetary gear system in which the drive power from the motor connects to the sun gear of the gear system. The sun gear then drives the planetary gears assembled with the external gear ring to operate. The planetary gear system can revolve on its own axis.

FIG. 4 shows an example schematic of a first embodiment of a combined milling and debris collection device, in accordance with embodiments of the disclosure. In particular, diagram 400 shows an embodiment in which, a third stage 410 of the gear train 407 can include a three-stage planetary gear box that is modified to have two outputs, described below. The tool of FIG. 4 is attached to a wireline 402 that can be used to raise and lower the tool within the well.

A first output of the gear box can be directly connected to the input of a pump 412, such as a portion of the pump coupled to an impeller. This first output can have a relatively high RPM and can drive the fluid pump 412. Further, the gear train 407 can be driven by a single input 411 from the motor 404.

The second output can have a relatively lower RPM but higher torque in comparison with the first rotational output. The second output can be coupled to a rotatable housing 487 portion of the tool, which in turn can be connected to the fluid pump housing 413, the milling bailer 414, and the bit face 416. Thus, the entire milling bailer 414 portion of the tool can rotate. Further, as shown in diagram 400, both first and second outputs from the gear train 407 spin in the same direction, as indicated by rotation direction indicators 403 and 405. Accordingly, since the fluid pump's 412 input has higher RPM than the pump housing 413, the fluid pump 412 operates at the difference between the two RPM values.

In some aspects, the milling bailer 414 can include a bailer portion shaped to intake fluid proximate a distal end of the bailer portion and allow the fluid to flow through a filter (not shown) and through the fluid pump 412, 413. Further, the milling bailer 414 can include a milling face 416 proximate the distal end of the bailer portion, the milling face 416 including at least one bit for milling and configured to perform a milling operation while fluid is flowing through the bailer portion. Further, in other aspects, the distal end of the bailer portion can include an aperture 423 in the milling face 416 that allows the fluid to enter an interior portion of the bailer portion.

In more detail, the first rotational input 403 at the first stage 406 can be a shaft 417 coupled to a sun gear 419. The sun gear 419 can be central gear that is fixed to the input shaft from the motor 404 such that it rotates at the same speed as the shaft. The sun gear 419, in turn, is coupled to at least two planet gears 434 on opposing sides of the sun gear 419. Although only two planet gears are shown, the assembly can include more than two planet gears. As shown in the diagram 400, each of the planet gears 434 meshes with the sun gear 419 at an interior mesh point of the mesh points 431 and meshes with a ring gear 435 at an exterior mesh point of the mesh points 431. In this example, a housing 436 can include a fixed planetary ring gear 435 that is mounted to the housing 436, as shown.

The diagram 400 also includes a first planetary carrier 427 spanning the first stage 406 and second stage 408 upon which the planet gears 434 are mounted. In this example, the planet gears 434 are mounted using a rotary bearing 433 that allows the planet gears 434 to rotate freely with respect to the planetary carrier 427. The movement of the planet gears 434 about the sun gear thereby causes the planetary carrier 427 to rotate. The rotational movement of the planetary carrier 427 is thereby converted to and serves as second rotational input to the second stage 408.

In more detail, the second rotational input (i.e., the rotational movement of the planetary carrier 427) at the second stage 408 can be coupled to a sun gear 429 of the second stage 408. For example, rather than being coupled to a shaft as explained with the sun gear 429 of the first stage 406, the sun gear 429 of the second stage 408 can be coupled to the planetary carrier 427 of the first stage 406. The sun gear 429 of the second stage 408, in turn, can mesh with at least two planet gears 444 on opposing sides of the second rotational input. Although only two planet gears are shown, the assembly can include more than two planet gears. Further, only one of the pair of planetary gears are labeled in the diagram 400 to reduce clutter in the diagram. As shown in the diagram 400, each of the planet gears 444 meshes with the sun gear 429 of the second stage 408 at an interior mesh point of the mesh points 441 and meshes with a ring gear 446 at an exterior mesh point of the mesh points 441. Again, the housing of the second stage 408 can be a planetary ring gear 446 that is mounted to a housing 436, as shown, containing the planet gears 444 and providing an exterior mesh point 441 for the planet gears 444. The planet gears 444 can be mounted to a second planetary carrier 437 using rotary bearings 443, such that the planet gears 444 can rotate within the rotary bearings 443, but rotational movement of the center of the planet gears 444 around the sun gear 429 causes the second planetary carrier 437 to rotate. The rotational movement of the second planetary carrier 437 provides a rotational input to the third stage 410.

The second planetary carrier 437 can couple to a shaft 449 that spans the second stage 408 and third stage 410. The shaft 449 can couple to a third sun gear 439 arranged as part of a third planetary gear box stage 410, such that rotation of the shaft 449 provides equivalent rotation of the third sun gear 439. The shaft 449 can also extend beyond the third sun gear 439, as shown, extending through a rotational bearing 464 mounted to a fixed portion of the housing 436. The shaft 449 can be coupled to the pump 412, 413, or more specifically the portion of the pump that drives the pump, such as an impeller, referred to herein as the pump input 412. In this manner, rotation of the shaft 449 can cause rotation of the pump input 412, such as by driving an impeller.

The third sun gear 439 at the third stage 410, which is driven by the shaft 449, can also be coupled to at least two planet gears 454 using gear mesh connections. Although only two planet gears are shown, the assembly can include more than two planet gears. Further, only one of the pair of planetary gears are labeled in the diagram 400 to reduce clutter in the diagram. As shown in the diagram 400, each of the planet gears 454 meshes with the third sun gear 439 at an interior mesh point of the mesh points 451 and meshes with a ring gear 455 at an exterior mesh point of the mesh points 451.

In the first and second stages 406, 408, each stage utilizes a ring gear that is mounted to a fixed housing 436. However, in the third stage 410, the ring gear 455 is mounted to a rotatable housing 487. The rotatable housing 487 mounts to the fixed housing 436 at a variety of coupling points, such as a rotary seal 457 around the shaft 449, a rotary seal 483 where an external portion of the fixed housing 436 meets the rotatable housing 487, and two rotary bearings 463, each of which is mounted to a portion of the fixed housing 436 located internally relative to the rotatable housing 487 as shown.

In this example, the fixed housing 436 extends into the third stage 410. Fox example, the fixed housing 436 holds the planet gears 454 in place, rather than using a gear carrier as in the first and second stages 406, 408. Because the fixed housing 436 does not rotate, and the planet gears 454 are mounted to the fixed housing by way of rotary bearings 453, the rotation of the third sun gear 439 causes rotation of the planet gears 454 but does not change the position of the planet gears 454. That is, the planet gears 454 do not rotate about the third sun gear 439 as in the first and second stages 406, 408. Instead, the planet gears 454 interface with a ring gear 455 at the exterior mesh points 451, causing the ring gear 455 itself to rotate. In this example, the ring gear 455 is mounted to the rotatable housing 487, such that any rotation of the ring gear 455 causes similar rotation of the rotatable housing 487.

The rotatable housing 487 can be coupled to various other components of the tool. For example, as shown in FIG. 4, the rotatable housing 487 is coupled to a pump housing 413 of the fluid pump. The pump housing 413 can be any portion of the pump aside from the pump input 412; for example, the pump housing 413 can be a shell that surrounds an impeller. Rotation of the pump input 412 and pump housing 413, relative to one another, can cause the pump to move fluid. For example, the pump input 412 can remain still while the pump housing 413 rotates in order to pump fluid. Similarly, the pump input 412 can rotate while the pump housing 413 remains still, and the pump will move fluid. In another example, the pump input 412 and pump housing 413 rotate at different speeds, causing the pump to operate based on the speed differential.

By way of operating the pump 412, 413, the tool can then pull fluid into a milling bailer 414, such as through an orifice 423 proximate the distal end of the milling bailer 414. The fluid can pass through one or more filters within the milling bailer 414 to remove debris. The filtered fluid then enters the pump 412, 413 and is expelled out of the pump housing 413.

At the same time that the pump 412, 413 is operating to filter the surrounding fluid, the milling bailer 414 can also be performing a milling operation. For example, the rotatable housing 487 of the tool can also be coupled to the milling bailer 414. In the example of FIG. 4, the rotatable housing 487 is coupled to the milling bailer 414 via the pump housing 413, such that the rotatable housing 487 rotates the pump housing 413, which rotates the milling bailer 414. In other examples, the rotatable housing 487 can be shaped to directly couple to the milling bailer 414. In both examples, rotation of the rotatable housing 487 translates into rotation of the milling bailer 414. The milling bailer 414 includes one or more bits 416 on the distal end, such that when the rotating bits come into contact with a material, such as metal, the bits remove a portion of the material to produce a milling effect.

FIG. 5 shows another example schematic of another embodiment of a combined milling and debris collection device, in accordance with embodiments of the disclosure. In this embodiment, like the embodiment shown in diagram 400 described above, a third stage 510 of the gear train 507 can include a planetary gearbox that is modified to have two rotational outputs, that is, a first rotational output and second rotational output, which can be connected and configured in a similar but not identical manner as described above to respective input 505, fluid pump 512, and fluid pump housing 513. However, in this embodiment the two outputs can spin in directions opposite to each other, as indicated by direction of rotation indicators 511 and 515. This increases the RPM difference, which may be preferable if the fluid pump 512 requires relatively high RPM to operate. In this embodiment as with the embodiment described above, the entire milling bailer 514 tool rotates.

In more detail, a first output of the gear box can be directly connected to the input of a pump 512, such as a portion of the pump coupled to an impeller. This first output can have a relatively high RPM and can drive the fluid pump 512, 513. Further, the gear train 507 can be driven by a single input from the motor 504. The tool of FIG. 5 is attached to a wireline 502 that can be used to raise and lower the tool within the well.

The second output can have a relatively lower RPM but higher torque in comparison with the first rotational output. The second output can be coupled to a rotatable housing 587 portion of the tool, which in turn can be connected to the fluid pump housing 513, the milling bailer 514, and the bit 516. Thus, the entire milling bailer 514 portion of the tool can rotate. Further, as shown in diagram 500, both first and second outputs from the gear train 507 spin in the opposite direction, as indicated by rotation direction indicators 511 and 515. In an example where the pump input 512 and the pump housing 513 rotate at different speeds (e.g., different RPM), the differential between those rotational speeds will drive the pump 512, 513.

In some aspects, the milling bailer 514 can include a bailer portion shaped to intake fluid proximate a distal end of the bailer portion and allow the fluid to flow through a filter (not shown) and through the fluid pump 512, 513. Further, the milling bailer 514 can include a milling face 516 proximate the distal end of the bailer portion, the milling face 516 including at least one bit for milling and configured to perform a milling operation while fluid is flowing through the bailer portion. Further, in other aspects, the distal end of the bailer portion can include an aperture 523 in the milling face 516 that allows the fluid to enter an interior portion of the bailer portion.

In more detail, the first rotational input 505 at the first stage 506 can be a shaft 517 coupled to a sun gear 519. The sun gear 519 can be central gear that is fixed to the input shaft 517 from the motor 504 such that it rotates at the same speed as the shaft 517. The sun gear 519, in turn, is coupled to at least two planet gears 534 that mesh with the sun gear 519. Although only two planet gears are shown, the assembly can include more than two planet gears. As shown in the diagram 500, each of the planet gears 534 meshes with the sun gear 519 at an interior mesh point of the mesh points 531 and meshes with a ring gear 535 at an exterior mesh point of the mesh points 531. In this example, a housing 536 can include a fixed planetary ring gear 535 that is mounted to the housing 536, as shown.

The diagram 500 also includes a first planetary carrier 527 spanning the first stage 506 and second stage 508 upon which the planet gears 534 are mounted. In this example, each planet gear is mounted to the carrier 527 using a rotary bearing 533 that allows the planet gears to rotate freely with respect to the planetary carrier 527. The movement of the planet gears 534 about the sun gear 519 thereby causes the planetary carrier 527 to rotate. The rotational movement of the planetary carrier 527 is thereby converted to and serves as second rotational input to the second stage 508.

In more detail, the second rotational input (i.e., the rotational movement of the planetary carrier 527) at the second stage 508 can be coupled to a sun gear 529 of the second stage 508. For example, rather than being coupled to a shaft as explained with the sun gear 519 of the first stage 506, the sun gear 529 of the second stage 508 can be coupled to the planetary carrier 527 of the first stage 506. The sun gear 529 of the second stage 508, in turn, can mesh with at least two planet gears 544. Although only two planet gears are shown, the assembly can include more than two planet gears. As shown in the diagram 500, each of the planet gears 544 meshes with the sun gear 529 of the second stage 508 at an interior mesh point of the mesh points 541 and meshes with a ring gear 545 at an exterior mesh point of the mesh points 541. Again, the housing of the second stage 508 can be a planetary ring gear 545 that is mounted to a housing 536, as shown, containing the planet gears 544 and providing an exterior mesh point 541 for the planet gears 544. The planet gears 544 can be mounted to a second planetary carrier 537 using rotary bearings 543, such that the planet gears 544 can rotate within the rotary bearings 543, but rotational movement of the center of the planet gears 544 around the sun gear 529 causes the second planetary carrier 537 to rotate.

The rotational movement of the planetary carrier 537 is then converted to third rotational input to the third stage 510. For example, the second planetary carrier 537 can couple to a shaft 549 that spans the second stage 508 and third stage 510. The shaft 549 can couple to a third sun gear 539 arranged as part of a third planetary gear box stage 510, such that rotation of the shaft 549 provides equivalent rotation of the third sun gear 539. The shaft 549 can also extend beyond the third sun gear 539, as shown, extending through rotational bearings 564. The shaft 549 can be coupled to the pump 512, 513, or more specifically the portion of the pump that drives the pump, such as an impeller, referred to herein as the pump input 512. In this manner, rotation of the shaft 549 can cause rotation of the pump input 512, such as by driving an impeller.

The third sun gear 539 at the third stage 510, which is driven by the shaft 549 and/or the second carrier 537, can also be coupled to at least two planet gears 554 using gear mesh connections. Although only two planet gears are shown, the assembly can include more than two planet gears. Further, only one of the pair of planetary gears are labeled in the diagram 500 to reduce clutter in the diagram. As shown in the diagram 500, each of the planet gears 554 meshes with the third sun gear 539 at an interior mesh point of the mesh points 551 and meshes with a ring gear 555 at an exterior mesh point of the mesh points 551.

The planet gears 554 can be mounted to a third planetary carrier 547 by way of rotational bearings 553. The rotational bearings 553 allow the planet gears 554 to rotate relative to the third planetary carrier 547, while the movement of the planet gears 554 about the sun gear 539 causes the third planetary carrier 547 to rotate. In this example, the third planetary carrier 547 is fixed to—or alternatively, formed as part of—a rotatable inner housing 557. The rotatable inner housing 557 is configured such that it can rotate within, and with respect to, the fixed housing 536 of the tool. For example, the fixed housing 536 can support the rotatable inner housing 557 using rotational bearings 563 that surround the rotatable inner housing 557 and are mounted within the fixed housing 536. The fixed housing 536 can also prevent fluid or debris from penetrating between the housing 536 and the rotatable inner housing 557 by using a rotary seal 559, as shown in the diagram 500.

The rotatable inner housing 557 can be configured such that it is rigidly coupled to a rotatable housing 587 that extends away from the fixed housing 536 of the tool. In some examples, rather than being rigidly coupled to one another, the rotatable inner housing 557 and rotatable housing 587 are formed as one piece that rotates together. In either example, rotation of the rotatable inner housing 557 can translate directly to rotation of the rotatable housing 587.

As shown, the rotatable inner housing 557 can extend through at least a portion of the rotatable housing 587. Additionally, the rotatable inner housing 557 can support the shaft 549 that serves as an input to the pump input 512.

The rotatable housing 587, in turn, can include a pump housing 513. The pump housing 513 can be any portion of the pump aside from the pump input 512; for example, the pump housing 513 can be a shell that surrounds an impeller. Rotation of the pump input 512 and pump housing 513, relative to one another, can cause the pump to move fluid. For example, the rotatable housing 587 can be coupled to the pump housing 513 by way of fasteners or welding, or can be formed together with the housing 513 in some examples. In either case, rotation of the rotatable housing 587 can cause equivalent rotation of the pump housing 513. As mentioned above, the pump input 512 can be driven by a shaft 549, which rotates at a different rate relative to the pump housing 513. This differential in rotational speeds can drive the pump 512, 513.

The rotatable housing 587 and/or the pump housing 513 can be coupled to various other components of the tool. For example, as shown in FIG. 5, the rotatable housing 587 is coupled to a pump housing 513 of the fluid pump, which is then rigidly coupled to a milling bailer 514, such as by using fasteners or welding. Therefore, rotation of the rotatable housing 587 translates into a same-speed rotation of the milling bailer 514. This can be accomplished by rigidly coupling the rotatable housing 587 directly to the milling bailer 514 in some examples (not shown).

By way of operating the pump 512, 513, the tool can then pull fluid into the milling bailer 514, such as through an orifice 523 proximate the distal end of the milling bailer 514. The fluid can pass through one or more filters within the milling bailer 514 to remove debris. The filtered fluid then enters the pump 512, 513 and is expelled out of the pump housing 513.

At the same time that the pump 512, 513 is operating to filter the surrounding fluid, the milling bailer 514 can also be performing a milling operation. For example, the rotatable housing 587 of the tool can also be coupled to the milling bailer 514. In the example of FIG. 5, the rotatable housing 587 is coupled to the milling bailer 514 via the pump housing 513, such that the rotatable housing 587 rotates the pump housing 513, which rotates the milling bailer 514. In other examples, the rotatable housing 587 can be shaped to directly couple to the milling bailer 514. In both examples, rotation of the rotatable housing 587 translates into rotation of the milling bailer 514. The milling bailer 514 includes a bit face 516 on the distal end having one or more bits, such that when the rotating bits come into contact with a material such as metal, the bits remove a portion of the material to produce a milling effect.

As noted, the disclosed systems as shown and described above (e.g., with respect to FIGS. 4 and 5) include a device that has a dual-output stage of a gear train. In some respects, the planetary gear trains described above can be configured such that the planetary carrier portion rotates in either direction based on the configuration of the intermediate planet gears. In such a device, one of the outputs can drive the fluid pump, while the other output rotates the entire debris collection tool, to which a bit is attached. This allows the device to avoid the use of a specialized bailers specific to this service; rather, a standard milling bailer that exists in the field can be reused. Further, the gear train of milling tools are modified in a relatively simplified manner to execute the functionality described herein.

Figure 6:
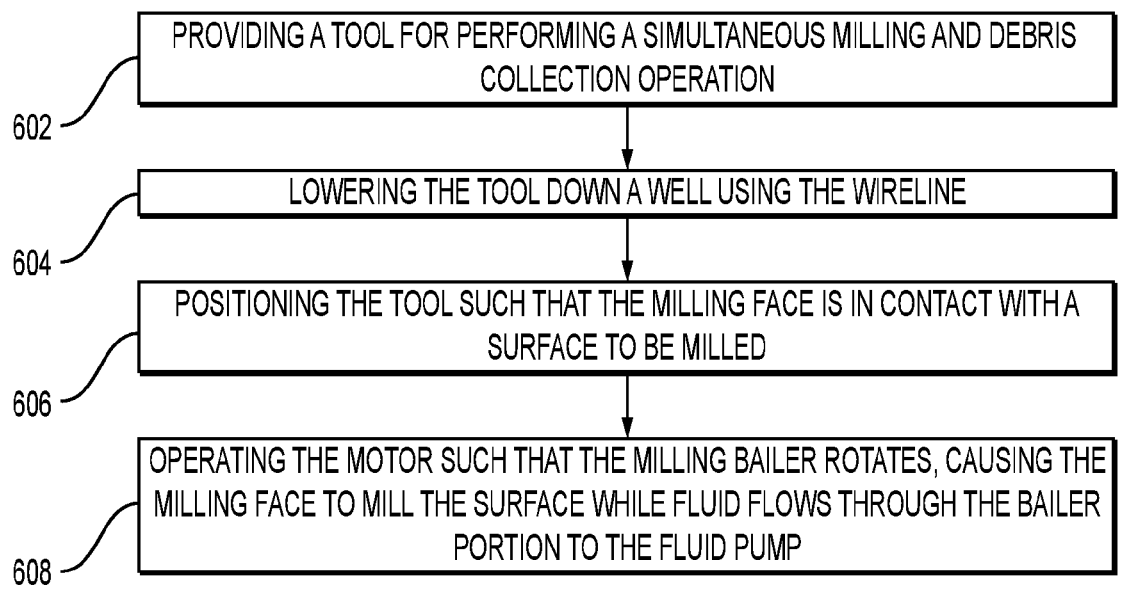
FIG. 6 shows an example flow chart illustrating some example operations for performing simultaneous milling and debris collection, in accordance with embodiments of the disclosure.

FIG. 6 shows an example flow chart illustrating some example operations of a method for performing simultaneous milling and debris collection, in accordance with embodiments of the disclosure, with each block representing a stage of an example method. At block 602, a tool can be provided. The tool may be attached to a suitable well access line such as a wireline cable, a length of coiled tubing, or the like. The well access line can extend downhole from a surface of the wellbore and is in communication with surface equipment, control equipment, and the like for communication of power, telemetry and control signals. A user can direct operation of the tool including setting a target torque value, setting a push force limit value, starting rotation of the bit and starting a milling or drilling operation. Stage 602 can also include providing a tool as described above, particularly with respect to the embodiments of FIGS. 4 and 5.

At block 604, the tool can be lowered down a well using the wireline. The tool can be deployed into the well on the well access line (e.g., the wireline) and maneuvered into a desired location within the well. At block 606, the tool can be positioned such that the milling face is in contact with a surface to be milled. In some wells, such as horizontal or deviated wellbores or the like, additional modules may be utilized to position the tool to the desired location, for example, by engaging with the walls of the well. The tool can provide a signal (e.g., an electrical signal) to a user that the milling surface has contacted the surface to be milled. At block 608, the motor can be operated such that the milling bailer rotates, causing the milling face to mill the surface while fluid flows through the milling bailer portion to the fluid pump. During operation of the tool, an electronics module can control the speed of the motor, and phase current samples from the motor can be used to control the torque output of the motor. Based on the phase current samples, firmware in the electronics module can calculate respective torque values experienced on the shaft of the motor. The calculated torque values can be used to report real-time torque measurements to the surface via a telemetry cartridge or the like. This calculated torque value is also used to request push force adjustment from the electronics module.

An example method, such as the method of FIG. 6, can also include retrieving the tool from the well and performing cleaning or maintenance operations. For example, the debris collection operation of the tool can cause a build-up of debris collected within a bailer portion of the tool. An example method can include cleaning this debris from the bailer, such as by removing one or more filters within the bailer for cleaning, or by pumping cleaning fluid through the bailer in a flow direction opposite the normal debris-collection direction.

The preceding description has been presented with reference to present embodiments. Persons skilled in the art and technology to which this disclosure pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims.

What is claimed is:

1. A device for performing a mechanical operation on a wireline, the device comprising:
    a motor;
    a gear train coupled to the motor, the gear train including a first rotational output and a second rotational output, the first rotational output and the second rotational output having different rotational speeds relative to each other;
    a fluid pump coupled to both the first rotational output and the second rotational output of the gear train, the fluid pump comprising:
        a pump housing coupled to the first rotational output of the gear train, and
        a pump input coupled to the second rotational output of the gear train; and
    a milling bailer coupled to the housing of the fluid pump and configured to rotate with the fluid pump housing, the milling bailer comprising:
        a bailer portion shaped to intake fluid proximate a distal end of the bailer portion and allow the fluid to flow through a filter and through the fluid pump; and
        a milling face proximate the distal end of the bailer portion, the milling face comprising at least one bit for milling and configured to perform a milling operation while the fluid is flowing through the bailer portion.

2. The device of claim 1, wherein the gear train comprises a three-stage planetary gear box comprising a sun gear, at least one planet gear coupled to the sun gear, and a planetary carrier gear coupled to the at least one planet gear.

3. The device of claim 2, wherein the first rotational output of the gear train is coupled to the sun gear of the three-stage planetary gear box and wherein the second rotational output of the gear train is coupled to the planetary carrier gear of the gear train.

4. The device of claim 2, wherein the sun gear and the planetary carrier gear rotate in a same direction.

5. The device of claim 2, wherein the sun gear and the planetary carrier gear rotate in opposite directions.

6. The device of claim 1, wherein the gear train is driven by a single input from the motor.

7. The device of claim 1, wherein the fluid pump is driven based on the rotational difference between the first rotational output and the second rotational output.

8. The device of claim 1, wherein the distal end of the bailer portion comprises an aperture in the milling face that allows the fluid to enter an interior portion of the bailer portion.

9. The device of claim 1, wherein the device further comprises a wireline cable head that receives the wireline and securely couples the device to the wireline.

10. A method of simultaneous milling and debris collection, the method comprising:
    providing a tool, the tool comprising:
        a motor;
        a gear train coupled to the motor, the gear train including a first rotational output and a second rotational output, the first rotational output and the second rotational output having different rotational speeds relative to each other;
        a fluid pump coupled to both the first rotational output and the second rotational output of the gear train, the fluid pump comprising:
            a pump housing coupled to the first rotational output of the gear train, and
            a pump input coupled to the second rotational output of the gear train; and
        a milling bailer coupled to the housing of the fluid pump and configured to rotate with the fluid pump housing, the milling bailer comprising:
            a bailer portion shaped to intake fluid proximate a distal end of the bailer portion and allow the fluid to flow through a filter and through the fluid pump; and
            a milling face proximate the distal end of the bailer portion, the milling face comprising at least one bit for milling and configured to perform a milling operation while the fluid is flowing through the bailer portion;
    lowering the tool down a well using a wireline;
    positioning the tool such that the milling face is in contact with a surface to be milled; and
    operating the motor such that the milling bailer rotates, causing the milling face to mill the surface while the fluid flows through the bailer portion to the fluid pump.

11. The method of claim 10, wherein the gear train comprises a three-stage planetary gear box comprising a sun gear, at least one planet gear coupled to the sun gear, and a planetary carrier gear coupled to the at least one planet gear.

12. The method of claim 11, wherein the first rotational output of the gear train is coupled to the sun gear of the three-stage planetary gear box and wherein the second rotational output of the gear train is coupled to the planetary carrier gear of the gear train.

13. The method of claim 11, wherein the sun gear and the planetary carrier gear rotate in a same direction.

14. The method of claim 11, wherein the sun gear and the planetary carrier gear rotate in opposite directions.

15. The method of claim 10, wherein the gear train is driven by a single input from the motor.

16. The method of claim 10, wherein the fluid pump is driven based on the rotational difference between the first rotational output and the second rotational output.

17. The method of claim 10, wherein the distal end of the bailer portion comprises an aperture in the milling face that allows the fluid to enter an interior portion of the bailer portion.

18. The method of claim 10, wherein the tool further comprises a wireline cable head that receives the wireline and securely couples the tool to the wireline.

19. The method of claim 10, further comprising retrieving the tool from the well by pulling the tool up by the wireline.

20. The method of claim 19, further comprising cleaning the bailer portion to remove debris collected within the bailer portion.

* * * * *